US005194056A

United States Patent [19]

Schiffhauer

[11] Patent Number: 5,194,056

[45] Date of Patent: Mar. 16, 1993

[54] AUTOMATIC TRANSMISSION FOR MOTOR VEHICLES

[75] Inventor: Michael Schiffhauer, Friedrichshafen, Fed. Rep. of Germany

[73] Assignee: Zahnradfabrik Friedrichshafen AG, Friedrichshafen, Fed. Rep. of Germany

[21] Appl. No.: 687,937

[22] PCT Filed: Dec. 13, 1989

[86] PCT No.: PCT/EP89/01532

§ 371 Date: May 31, 1991

§ 102(e) Date: May 31, 1991

[87] PCT Pub. No.: WO90/07072

PCT Pub. Date: Jun. 28, 1990

[30] Foreign Application Priority Data

Dec. 15, 1988 [DE] Fed. Rep. of Germany ....... 3842188

[51] Int. Cl.[5] .............................................. F16H 57/10

[52] U.S. Cl. .................................. 475/325; 475/271; 475/313

[58] Field of Search ............... 475/271, 284, 285, 296, 475/313, 314, 315, 316, 325

[56] References Cited

U.S. PATENT DOCUMENTS 3,733,928 5/1973 Uozumi et al. ..................... 475/278
4,468,982 9/1984 Fujita ............................. 475/325 X
4,747,323 5/1988 Kiuchi et al. .................. 475/285 X

FOREIGN PATENT DOCUMENTS 8700901 12/1987 PCT Int'l Appl. .

*Primary Examiner*—Leslie A. Braun
*Assistant Examiner*—William O. Trousdell
*Attorney, Agent, or Firm*—Herbert Dubno

[57] ABSTRACT

In an automatic transmission (1) for motor vehicles with a reduced planetary linkage, whose planet gears (9 and 10) mesh with each other and share a common carrier (11), whose sun gear corotationally mounted on a hollow shaft (4) as well as whose sun gear (13) corotationally mounted on an intermediate shaft can be selectively connected via clutches (3 and 5) with an input shaft, whereby the intermediate shaft (6) can be selectively braked via a first friction brake (16) and a ring gear of the planetary linkage is connected with the driven gear (15) of the automatic transmission (1), a clearly structured design has to be created with simultaneous reduction of construction expeditures. For this purpose, the intermediate shaft (6) is built as a central solid shaft which protrudes beyond the driven gear (15) on the transmission-output side and the first friction brake (16) engages this segment.

9 Claims, 2 Drawing Sheets

| | 5 | 3 | 19 | 18 | 16 |
|---|---|---|---|---|---|
| G.1 | | ● | | ● | |
| G.2 | | ● | | | ● |
| G.3 | | ● | ● | | |
| G.4 | | | ● | | ● |
| G.R | ● | | | ● | |

AUTOMATIC TRANSMISSION FOR MOTOR VEHICLES

BACKGROUND OF THE INVENTION

The invention relates to an automatic transmission for motor vehicle with a reduced planetary linkage, whose planet gears of a first and second set of planetary gears mesh with each other and share a common carrier whereby an inner sun gear of the first set of planetary gears rotating together with a hollow shaft and the sun gear of the second set of planetary gears rotating together with an intermediate shaft can be selectively linked to an input shaft via a first clutch and via a second clutch, respectively the intermediate shaft can be braked via a first friction brake and whereby the carrier is connected at its transmission-input side end with a second friction brake and a ring gear of the second set of planetary gears with a driven gear of the automatic transmission, and whereby the intermediate shaft is built as a central solid shaft which traverses the driven gear, and the first friction brake engages the segment of the intermediate shaft extending beyond the drive gear on the transmission-output side.

An automatic transmission of the aforementioned kind is known from U.S. Pat. No. 3,733,928 (FIG. 10). Therein the clutches which can link the hollow shaft and the intermediate shaft with the input shaft and the second friction brake which can lock the carrier of the two sets of planetary gear are arranged outside the radial contour of the planetary linkage, so that a construction with a relatively big axial length results. Besides, this automatic transmission can not be operated in overdrive.

SUMMARY OF THE INVENTION

Therefore, it is the object of the invention to eliminate the mentioned drawbacks, and as a result to reduce the overall dimensions of an automatic transmission of the aforementioned kind and to reduce the related production costs.

This object is attained according to the characterization part of claim 1 due to the fact that the carrier can be connected with the input shaft via a third clutch which is located after the first and the second clutch considered in the direction of the transmission-output side. Thereby, a clearly structured design of the drive connection between input shaft and planetary linkage results, with an actuation of the second set of planetary gears via the second clutch and the central intermediate shaft, an actuation of the first set of planetary gears via the first clutch and the hollow shaft surrounding the intermediate shaft and finally an actuation of the common carrier via the third clutch.

Further advantageous embodiments of the invention are described in the dependent claims 2 to 9. According to claim 2, the second friction brake can be arranged radially with respect to the planetary linkage, which reduces the length of the transmission.

In the embodiment of the invention according to claim 3, the second friction brake and the third clutch are supposed to have a common inner disk carrier. Further, according to claim 4, the first and the third clutch can have a common outer disk carrier opposite with respect to the input shaft. The use of common inner, respectively outer disk carriers leads to a reduction of the production expenditures for the automatic transmission. Besides, for the clutches and friction brakes largely similar friction disks can be used. So for instance according to claim 5, the clutch disks of the first and the third clutch, as well as the disks of the second friction brake are of identical design.

According to claim 6, a supporting element with control cylinders for the first and third clutch, as well as for the second friction brake is provided on the input shaft. According to claim 7, the outer circumference of the supporting element is meant to form the outer disk carrier for the first and third clutch, whereby it corbels in axial directions and on each of the frontal sides of the supporting element a control cylinder for the first and third clutch is provided. This supporting element can double advantageously as an input-side transmission element of the clutches and can receive the control cylinders together with the pressure medium supply. With the provided simultaneous arrangement of all clutches in this supporting element comes a considerable simplification from the point of view of production expenditure and the operation of the automatic transmission.

As proposed in claim 8, on the output side an outer disk carrier of the first friction brake can have an axially extending flange, whereupon the driven gear is supported. As a result, the driven gear is supported directly in the housing of the automatic transmission via the outer disk carrier, and not on the intermediate shaft, so that in this point no bearing forces act on the intermediate shaft. Thereby, it is also possible to avoid a corresponding dimensioning of the output-side support of the intermediate shaft.

Finally, according to claim 9, a control cylinder of the second friction brake can be built on a frontal side of the outer disk carrier of the first friction brake. According to claims 8 and 9, this outer disk carrier of the first friction brake integrated in the transmission housing takes over several functions, namely the support of the intermediate shaft, the accommodation of the control cylinder of the second friction brake and the interlocking outer disk guidance of the first friction brake.

BRIEF DESCRIPTION OF THE DRAWING

For the further clarification of the invention, reference is made to the drawing, wherein an embodiment example is shown in a simplified manner. The drawing shows.

DESCRIPTION OF THE PREFERRED EMBODIMENT

Figures 1, 2:
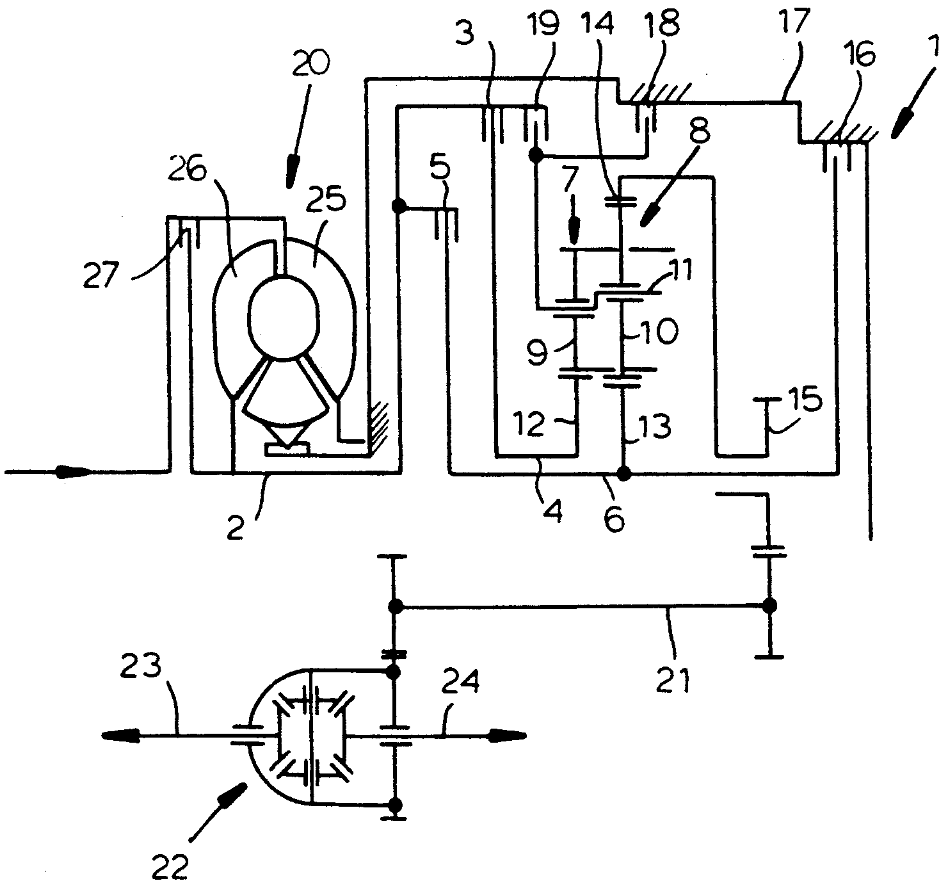
FIG. 1 a schematic representation of an automatic transmission built in accordance with the invention, FIG. 2 a shift diagram of the automatic transmission of FIG. 1 and FIG. 3 a longitudinal section through a portion of an automatic transmission built in accordance with FIG. 1 in the area of its reduced planetary linkage and of the thereto assigned clutches and friction brakes.
Figure 3:
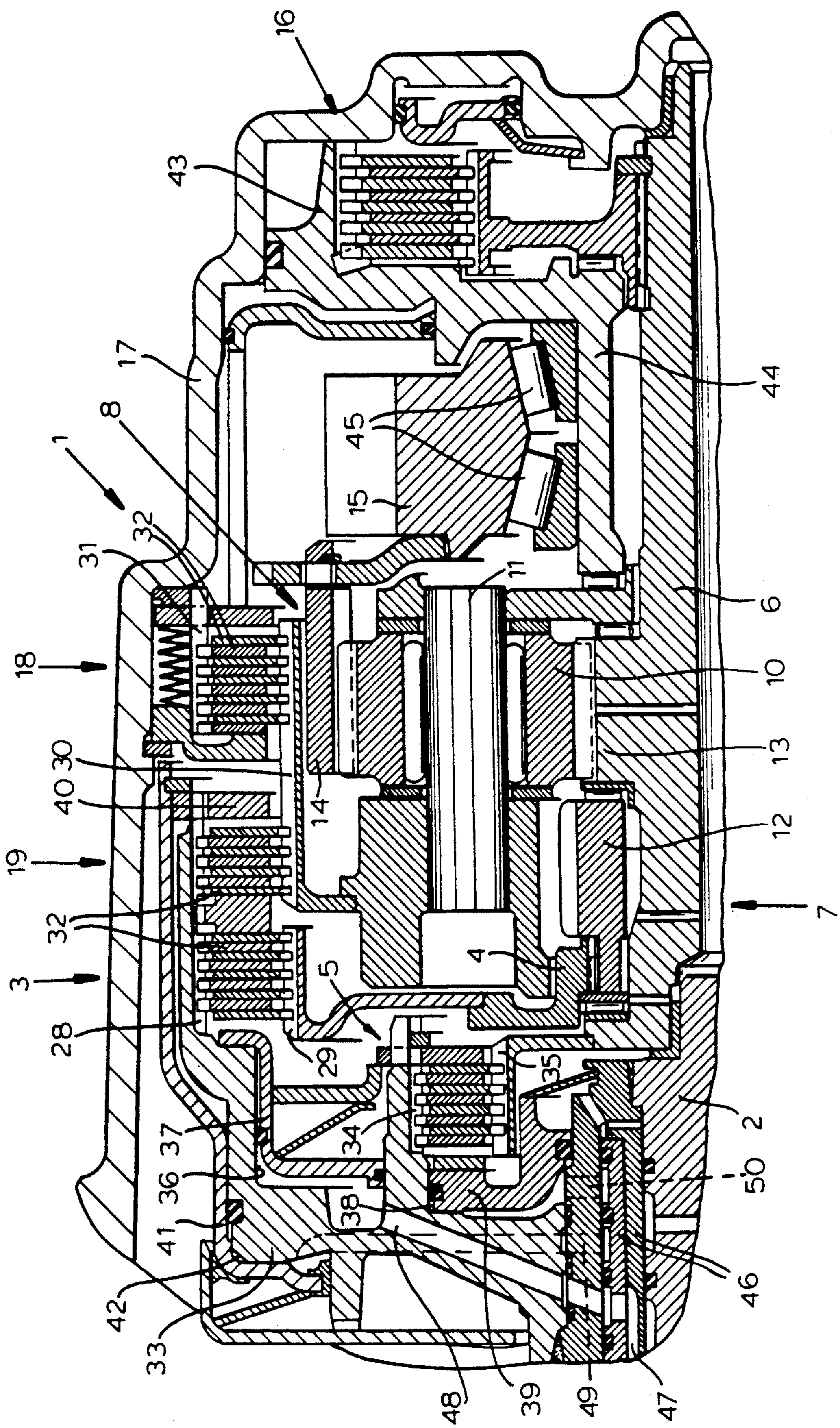

In FIGS. 1 and 3, the reference numeral 1 marks an automatic transmission whose input shaft 2 can be connected with a hollow shaft 4 via a first clutch 3. Besides, the input shaft 2 can be connected via a second clutch 5 with an intermediate shaft 6. Further, the automatic transmission 1 has a reduced planetary linkage of the Ravigneaux type, with a first set of planetary gears 7 and a second set set of planetary gears 8. The planet gears 9 of the first set of planetary gears 7 mesh thereby with the planet gears 10 of the second set of planetary gears 8, and both sets of planetary gears 7 and 8 have a common carrier 11.

The hollow shaft 4 receives a corotationally fastened sun gear 12 of the first planetary gear 7, while a sun gear 13 of the second planetary gear 8 is fastened on the intermediate shaft 6. Besides, the planet gears 10 of the second set of planetary gears 8 are in engagement with a ring gear 14, to which in turn a driven gear (take-off gear) 15 on the output side is fastened. The intermediate shaft 6 designed as a solid shaft passes through this driven gear 15 and accommodates at its output-side end a first friction brake 16, by means of which it can be affixed to a transmission housing 17.

Between the carrier 11 and the transmission housing 17, there is a second friction brake 18. Finally, the carrier 11 can be connected to the input shaft 2 via a third clutch.

As can be seen from FIG. 1, the automatic transmission 1 is driven by an internal combustion engine which is not shown in the drawing, via a hydrodynamic torque converter 20. This internal combustion engine together with the automatic transmission 1 are supposed to be built into the motor vehicle, across its frontal side, whereby according to FIG. 1, the actuation of a front-axle differential takes place from the drive gear 15 via a reducer unit 22. The half shafts 23 and 24 driving the front wheels of the motor vehicle which are not shown in the drawing branch off from this reducer unit 22. The hydrodynamic torque converter 20 has a pump wheel 25 and a turbine wheel 26, whereby a bypass clutch 27 establishing a frictional engagement between the pump wheel and turbine wheel 25, 26 insures a slip-free transmission of the driving torque from the internal combustion engine to the input shaft 2 of the automatic transmission 1.

FIG. 2 represents the shift diagram of the automatic transmission 1 shown in FIG. 1. From this diagram it can be seen which clutches and friction brakes are involved in the individual speeds G1 to G4 or GR. In a first speed marked G1 the clutch 3 and the friction brake 18 are engaged, so that starting out from the input shaft 2 with a stationary carrier 11, from the sun gear 12 of the first planetary gear set 7 via the therewith meshing planet gears 10 of the second planetary gear set 8 the ring gear 14 and finally the driven gear 15 are actuated. In is first speed G1 the engine's braking torque is used; However, it is also possible to connect the friction brake 18 in parallel with a free-wheel in the known manner, so that in the first speed of the transmission a free-wheel effect is present.

By shifting up from the first speed G1 into the second speed G2, the second friction brake 18 is released and the first friction brake 16 is engaged. As a result, the sun gear 13 of the second set of planetary gears 8 is stationary and again the actuation takes place starting from the sun gear 12 via the meshing planet gears 9 and 10 while the carrier 11 is freely rotating, to the ring gear 14 and thereby to the driven gear 15.

In the third speed G3, the clutches 3 and 19 are engaged, and at the actuation of the two planetary gear sets 7 and 8 in block a direct throughput to the driven gear 15 takes place. In a fourth speed G4 the clutch 19 and the friction brake 16 are engaged. Thereby, starting from the input shaft 2 the carrier 11 is driven and for the reduction ratio of this first speed designed as overdrive only the second planetary gear set 8 transmits torque.

Finally in a reverse speed marked with GR in the shift diagram, the clutch 5 and the friction brake 18 are engaged. This way, an actuation of the intermediate shaft 6 and the therewith connected sun gear 13 occurs. The sun gear 13 drives the planet gears 10 of the second planetary gear set 8 while the carrier 11 is stationary, whereby a power take-off from the ring gear 14 to the driven gear 15 takes place.

Further, from FIG. 3 can be seen that the first clutch 3 and the third clutch 19 have a common outer disk carrier 28. An inner disk carrier 29 connected to the sun gear 12 via hollow shaft 4 has the same radial measurements as a common inner disk carrier 30 of the clutch 19 and the friction brake 18. Since an outer disk carrier 31 of the friction brake 18 again corresponds dimensionally with the outer disk carrier 28, absolutely identical clutch or brake discs 32 result for the clutches 3 and 19 and the friction brake 18.

The outer disk carrier 28 is a component of a supporting element 33, which is connected and rotates together with the input shaft 2. This supporting element 33 accommodates at its frontal end on the input side an outer disk carrier 34 of the clutch 5, while an inner disk carrier 35 of this same clutch 5 is connected with the intermediate shaft. At this frontal end of the supporting element 33 on the input side, in the outer radial area, also the control cylinder 36 with an actuating piston 37 pertaining to clutch 3 are arranged. A walling of the control cylinder 36 is thereby designed as a common component with the outer disk carrier 34 of clutch 5. On the same frontal end in the supporting element 33 the control cylinder 38 with the actuation piston 39 pertaining to clutch 5 are arranged, radially surrounded by the outer disk carrier 34 of clutch 5.

A pressure disk 40 acting upon the clutch disks 32 of the third clutch 19 is fastened to an actuation piston 41 radially surrounding the outer disk carrier 28, whereby the actuation piston 41 can be displaced over an actuation space 42 located at the input-side frontal end.

The first friction brake 16 has an outer disk carrier 43 which is nonrotatably guided in the transmission housing 17. This outer disk carrier 43 is provided with an axially extending flange 44, whereon the driven gear 15 is supported by means of tapered roller bearings. For the supply of pressure medium, distributor shells 46 are provided in the control cylinders 36 and 38, as well as in the actuation space 42, these distributor shells feeding the pressure medium into the pressure-medium bores 48, 49 and 50, via axial feed pipes 47 with angular offset, of which only one is shown in the drawing.

The embodiment of the automatic transmission shown in FIG. 3 has among others the following advantages: The supporting element 33 which is corotationally mounted on the input shaft 2 functions simultaneously as outer disk carrier 28 of clutches 3 and 19, as outer disk carrier 34 of clutch 5 and at the same time accommodates the control cylinders 36, 38 and 42 of these clutches 3, 5 and 19. This results in a very compact construction of the actuation elements, combined with low expenditures for their production. Via the supporting element 33 rotating together with the input shaft 2, the pressure medium can be supplied without sealing problems via distributor shells 46 to the aforementioned control cylinders 36, 38 and 42. The constructional expenditures are further reduced by the fact that common outer disk carriers 28 as well as common inner disk carriers 30 are provided for the clutches 3 and 19 as well as for the clutch 19 and the friction brake 18. The intermediate shaft 6 needs no complicated support system, since the first friction brake 16 is supported in the transmission housing 17 by the radially extending flange 44 of the outer disk carrier 43.

REFERENCE NUMERALS

1 automatic transmission
2 input shaft
3 first clutch
4 hollow shaft
5 second clutch
6 intermediate shaft
7 first planetary gear set
8 second planetary gear set
9 planet gear of 7
10 planet gear of 8
11 carrier
12 sun gear of 7
13 sun gear of 8
14 ring gear
15 driven gear (take-off gear)
16 first friction brake
17 transmission housing
18 second friction brake
19 third clutch
20 hydrodynamic torque converter
21 reducer unit
22 front-Oaxle differential
23 half shaft
24 half shaft
25 pump wheel of 20
26 turbine wheel of 20
27 bypass clutch
28 outer disk carrier of 3 and 19
29 inner disk carrier of 3
30 inner disk carrier of 18 and 19
31 outer disk carrier of 18
32 clutch or brake disks
33 supporting element
34 outer disk carrier of 5
35 inner disk carrier of 5
36 control cylinder of 3
37 actuating piston of 3
38 control cylinder of 5
39 actuating cylinder of 5
40 pressure disk of 19
41 actuating piston of 19
42 actuation space
43 outer disk carrier of 16
44 flange of 16
45 tapered roller bearing
46 distributor shells
47 feed pipes
48 pressure-medium bore
49 pressure-medium bore
50 pressure-medium bore

I claim:

1. An automatic transmission for a motor vehicle, said transmission comprising a reduction planetary gearing device having an input side and an output side, said planetary gearing device having a first planetary gear set and a second planetary gear set, said first and second planetary gear sets having planet gears that mesh with each other and share a common carrier, said first planetary gear set having a sun gear being fixedly secured to a rotatable hollow shaft, said hollow shaft being selectively secured by a first clutch member to an input shaft, said second planetary gear set having a sun gear being fixedly secured to an intermediate shaft for continuous rotation therewith, said intermediate shaft being selectively secured by a second clutch member to said input shaft, a first friction brake means being secured to said intermediate shaft for braking said intermediate shaft, said common carrier member of said first and second planetary gear sets having a second friction brake means connected to its transmission-input side end, and said second planetary gear set having a ring gear being connected with a driven wheel of the automatic transmission, the intermediate shaft being formed as a solid shaft in cross-section and passing through the driven gear, wherein the first friction brake means engages a segment of said intermediate shaft which extends axially beyond the driven gear on the transmission output-side end, and said common carrier member being selectively connected with the input shaft via a third clutch member which is located axially after the first and the second clutch members in the direction of the transmission-output side.

2. Automatic transmission for motor vehicles according to claim 1, characterized in that the second friction brake (18) is arranged radially outward from the two sets of planetary gears (7 and 8) of the planetary linkage.

3. Automatic transmission for motor vehicles according to claim 1, characterized in that the second friction brake (18) and the third clutch (19) have a common inner disk carrier (30).

4. Automatic transmission for motor vehicles according to claim 1, characterized in that the first and the third clutch (3 and 19) have a common outer disk carrier (28) which is connected to the input shaft (2).

5. Automatic transmission for motor vehicles according to one of claims 3 and 4, characterized in that clutch and brake disks (32) of the first and third clutch (3 and 19), as well as of the second friction brake (18) are of identical design.

6. Automatic transmission for motor vehicles according to claim 1, characterized in that a supporting element (33) mounted on input shaft (2) is provided with control cylinders (36, 38 and 42) for the first and the third clutch (3 and 19), as well as for the second friction brake (18).

7. Automatic transmission for motor vehicles according to claim 6, characterized in that the supporting element (33) by corbelling in axial direction at its outer circumference forms the outer disk carrier (28) for the first and the third clutch (3 and 19) and that their control cylinders (36 and 42) are each built on one of the two frontal sides of the supporting element (33).

8. Automatic transmission for motor vehicles according to claim 1, characterized in that an outer disk carrier (43) of the first friction brake (16) is designed as a component with an axially extending flange (44), whereupon the driven gear (15) is supported.

9. Automatic transmission for motor vehicles according to claim 1, characterized in that a control cylinder of the second friction brake (18) is built on a frontal side of the outer disk carrier (43) of the first friction brake (16).

* * * * *